United States Patent
Koutsofios et al.

(10) Patent No.: US 12,395,964 B2
(45) Date of Patent: Aug. 19, 2025

(54) ARCHITECTURE FOR SCALABLE SMART ALERTING ACROSS A MULTITUDE OF DATA STREAMS

(71) Applicant: AT&T Intellectual Property I, L.P., Atlanta, GA (US)

(72) Inventors: Eleftherios Koutsofios, Berkeley Hts, NJ (US); Tamraparni Dasu, New Vernon, NJ (US); Yaron Kanza, Fair Lawn, NJ (US); Divesh Srivastava, Summit, NJ (US); Rajat Malik, Metuchen, NJ (US); Gordon Woodhull, Beacon, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 822 days.

(21) Appl. No.: 17/699,969

(22) Filed: Mar. 21, 2022

(65) Prior Publication Data
US 2023/0300785 A1   Sep. 21, 2023

(51) Int. Cl.
*H04W 68/00* (2009.01)
*G06N 7/01* (2023.01)
(Continued)

(52) U.S. Cl.
CPC ............ *H04W 68/005* (2013.01); *G06N 7/01* (2023.01); *H04M 1/724* (2021.01); *H04W 4/12* (2013.01); *H04W 4/50* (2018.02)

(58) Field of Classification Search
None
See application file for complete search history.

(56) References Cited

U.S. PATENT DOCUMENTS

2014/0078151 A1   3/2014   Garr et al.
2015/0169142 A1   6/2015   Longo et al.
(Continued)

OTHER PUBLICATIONS

Huang et al., "Responsive alert delivery over IP network", Nov. 4, 2013, IEEE, 2013 IEEE 1st International Conference on Cyber-Physical Systems, Networks, and Applications (CPSNA) (2013, pp. 19-25) (Year: 2013).*

(Continued)

*Primary Examiner* — Davoud A Zand
(74) *Attorney, Agent, or Firm* — Guntin & Gust, PLC; Robert Gingher

(57) ABSTRACT

Aspects of the subject disclosure may include, for example, a device including a processing system including a processor; and a memory that stores executable instructions that, when executed by the processing system, define operations of modules that monitor a computational hierarchy, the modules include a first module for generating base alerts with a hierarchical key associated with an operation of the computational hierarchy and for rolling up the base alerts based on the computational hierarchy, resulting in rolled-up base alerts; a second module for generating super alerts from a concentration of the rolled up base alerts; and a third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface. Other embodiments are disclosed.

20 Claims, 8 Drawing Sheets

(51) Int. Cl.
    *H04M 1/724*   (2021.01)
    *H04W 4/12*    (2009.01)
    *H04W 4/50*    (2018.01)

(56) References Cited

U.S. PATENT DOCUMENTS

| | | |
|---|---|---|
| 2019/0042887 A1 | 2/2019 | Nguyen et al. |
| 2020/0067969 A1* | 2/2020 | Abbaszadeh ............ G06N 5/04 |
| 2021/0144164 A1 | 5/2021 | Mathur et al. |
| 2022/0038332 A1* | 2/2022 | Umakanth ............ H04L 41/142 |
| 2022/0250328 A1 | 8/2022 | Buller et al. |
| 2023/0161661 A1* | 5/2023 | Higgins .............. G06F 11/0772 |
| | | 714/37 |
| 2023/0297645 A1 | 9/2023 | Dasu et al. |
| 2023/0325064 A1 | 10/2023 | Woodhull et al. |
| 2023/0325226 A1 | 10/2023 | Malik et al. |

OTHER PUBLICATIONS

"Elki", Wikipedia, https://en.wikipedia.org/wiki/ELKI, printed Mar. 2022, 7 pages.

"Scikit-learn", Wikipedia, https://en.wikipedia.org/wiki/Scikit-learn, printed Mar. 2022, 3 pages.

"Weka (machine learning)", Wikipedia, https://en.wikipedia.org/wiki/Weka_(machine_learning), printed Mar. 2022, 4 pages.

Dasu, Tamraparni et al., "Don't Cry Wolf", Conference Paper, https://www.researchgate.net/publication/339887448, Oct. 2019, 3 pages.

Brown, P.E. , et al., "Don't Cry Wolf", Oct. 5-8, 2019 IEEE International Conference on Data Science and Advanced Analytics (DSAA), 4 pgs.

* cited by examiner

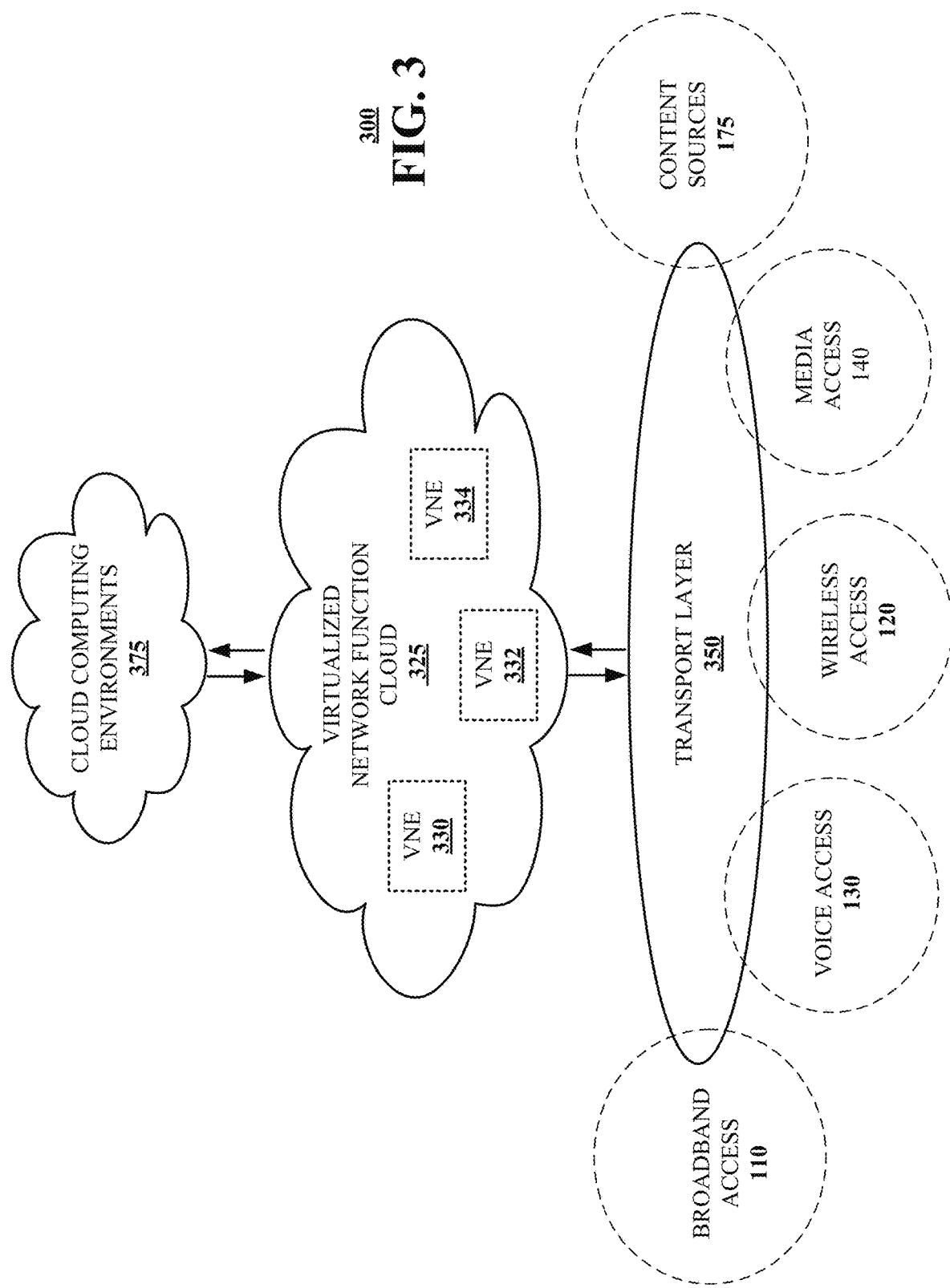

600

ARCHITECTURE FOR SCALABLE SMART ALERTING ACROSS A MULTITUDE OF DATA STREAMS

FIELD OF THE DISCLOSURE

The subject disclosure relates to an architecture for scalable smart alerting across a multitude of data streams.

BACKGROUND

Data streams evolve rapidly, so an architecture that evaluates alerts must be able to retrain models efficiently in real time.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
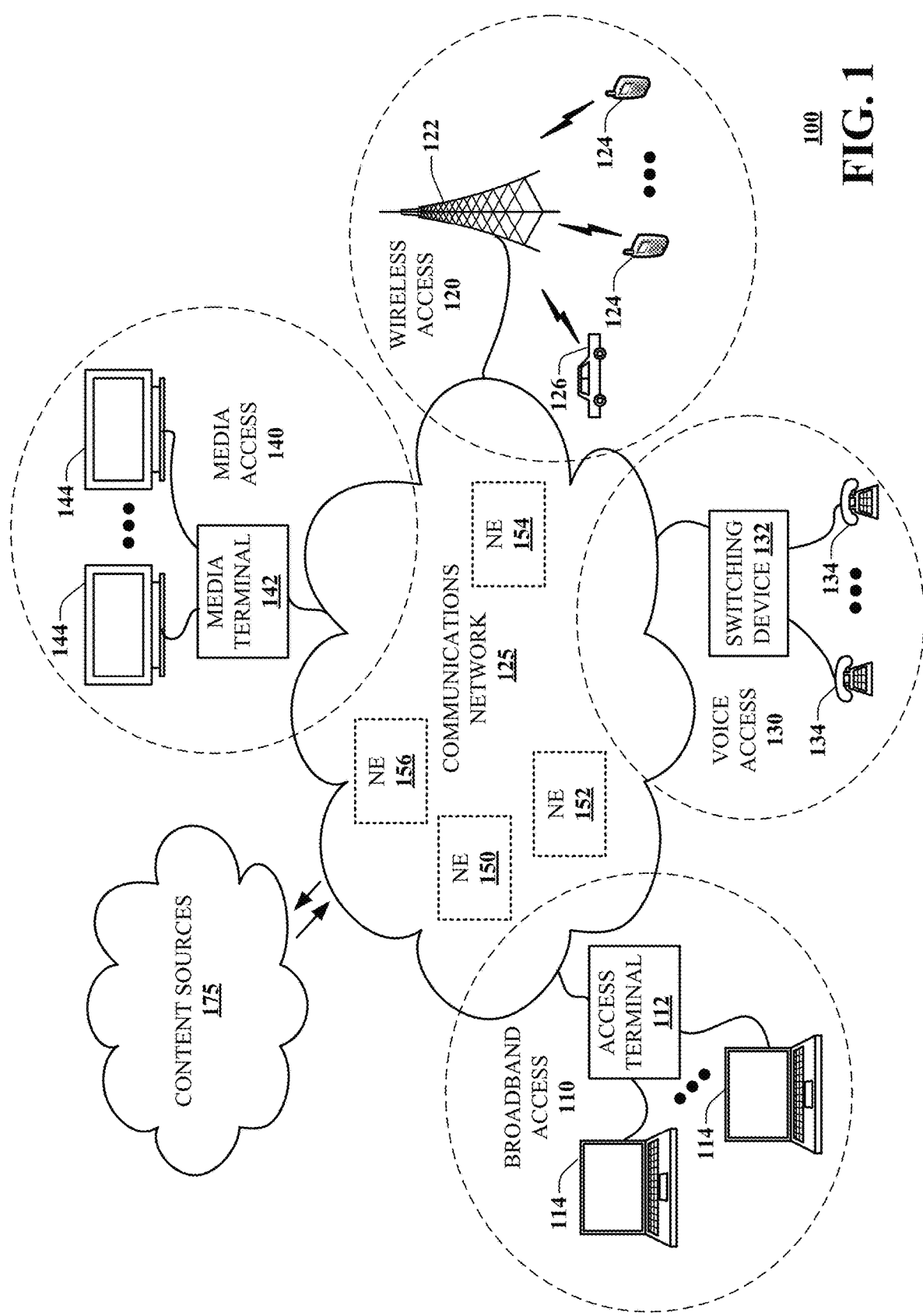
FIG. 1 is a block diagram illustrating an exemplary, non-limiting embodiment of a communications network in accordance with various aspects described herein.

The subject disclosure describes, among other things, illustrative embodiments for a modular architecture for scalable smart alerting across a multitude of data streams. Other embodiments are described in the subject disclosure.

One or more aspects of the subject disclosure include a device including a processing system including a processor; and a memory that stores executable instructions that, when executed by the processing system, define operations of modules that monitor a computational hierarchy, the modules include a first module for generating base alerts with a hierarchical key associated with an operation of the computational hierarchy and for rolling up the base alerts based on the computational hierarchy, resulting in rolled-up base alerts; a second module for generating super alerts from a concentration of the rolled up base alerts; and a third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

One or more aspects of the subject disclosure include a non-transitory, machine-readable medium, comprising executable instructions that, when executed by a processing system including a processor, facilitate formation and operations of a plurality of modules that monitor a computational hierarchy, the modules including: a first module for generating base alerts with a hierarchical key associated with an operation of the computational hierarchy and for rolling up the base alerts based on the computational hierarchy, resulting in rolled-up base alerts; a second module for generating super alerts from a concentration of the rolled-up base alerts; and a third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

One or more aspects of the subject disclosure include a method of facilitating formation and operations of a first module, by a processing system including a processor, the operations comprising generating base alerts with a hierarchical key associated with an operation of the computational hierarchy and for rolling up the base alerts based on the computational hierarchy, resulting in rolled-up base alerts; facilitating formation and operations of a second module, by the processing system, the operations of the second module comprising generating super alerts from a concentration of the rolled-up base alerts; and facilitating formation and operations of a third module, by the processing system, the third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

Referring now to FIG. 1, a block diagram is shown illustrating an example, non-limiting embodiment of a system 100 in accordance with various aspects described herein. For example, system 100 can facilitate in whole or in part monitoring a computational hierarchy; forming modules for generating base alerts with a hierarchical key associated with an operation of the computational hierarchy and for rolling up the base alerts based on the computational hierarchy, for generating super alerts from a concentration of the rolled up base alerts; and for including a first plurality of models that selects the super alerts based on priority, persistence of anomalies, pervasiveness of the super alerts generated, recency, or a combination thereof, and generates a smart alert based on voting on the super alerts selected by the first plurality of models, and for presenting the smart alert on a user interface. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142.

In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
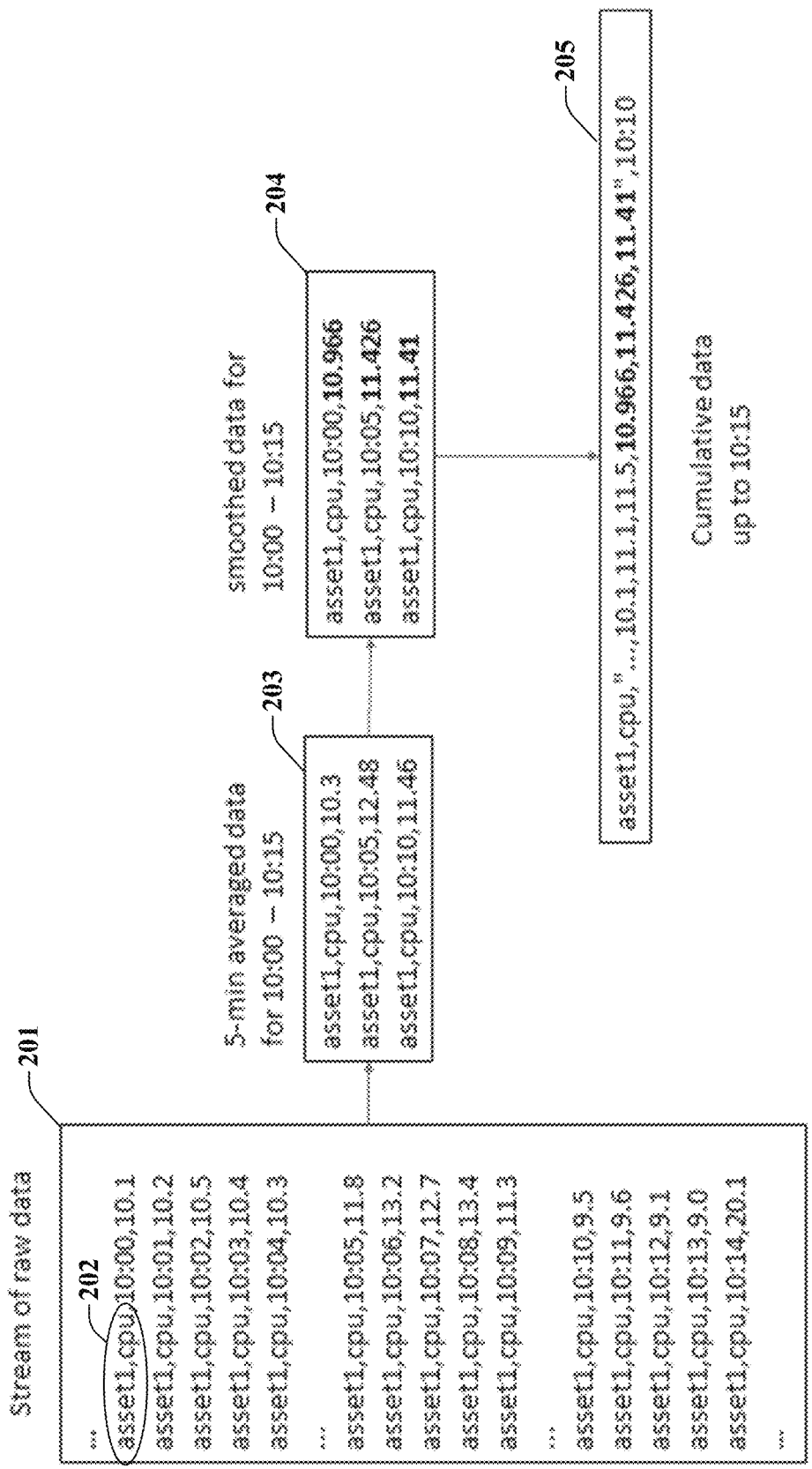
FIG. 2A is a block diagram illustrating an example, non-limiting embodiment of a portion of a modular system for scalable smart alerting that collects real time data streams functioning within the communication network of FIG. 1 in accordance with various aspects described herein.

FIG. 2A is a block diagram illustrating an example, non-limiting embodiment of a portion of a modular system for scalable smart alerting that collects real time data streams functioning within the communication network of FIG. 1 in accordance with various aspects described herein. System 200 is designed for any general stream of entities with features or dimensions. The features describe a monitored entity, e.g., a network asset, and metrics that are measured continuously for this entity. Anomalies in such streams are often an indication of a problem. System 200 monitors the data streams and alerts on anomalies in the metric values measured on the entities (assets). System 200 is adapted to run in a cloud computing environment. Cloud systems tend to function better with a small number of large files, rather than having to store many files because there is less metadata to keep track of. One difficulty in a modular system is that there is a lot of transfer of data between the modules. Aggregating too much data in a module before sending it to the next module would cause a delay in alerting. Not aggregating and caching would lead to too many communication attempts, which could result in large computational overhead, especially in a cloud environment. Smart partitioning enables an optimal tradeoff between the number of files and their size, i.e., finding an effective file size that reduces the number of files that the system needs to maintain. While there may be many small files, only a few are touched because of the cumulative files generated by system 200. The system 200 is implemented in a modular pipeline, which is flexible, provides local adaptation to changes and easier detection of failures, as discussed further below in connection with FIG. 2B, while still being efficient, especially in parts of the system where information is transferred between the modules.

System 200 uses cumulative files that combine historical data from raw files from individual streams into a single record that is identified by a key. Each update entails adding 3 new cumulative records and dropping the three oldest records, since models are updated after every 3 data updates. System 200 stores exactly the data needed for building the models, with no wasted space. This also helps deal with delayed data since system 200 only changes the cumulative records rather than touch all the files that were needed to build the models.

As shown in FIG. 2A, system 200 collects a stream of raw metrics 201. In an embodiment, system 200 listens for metrics from a message bus, e.g., Kafka. The metric records arrive as a stream with multiple partitions, in a near real-time fashion. System 200 assigns a key 202 to each of these metric records based on the asset that they are related to, e.g., Application: Service: Component: Host, etc. In other words, the key identifies the part of a computing hierarchy (see FIG. 2C below) where the metric originates. System 200 extracts a timestamp from each of these records. System 200 saves these records in cumulative files 205 that cover non-overlapping fifteen-minute intervals. The data for each application is stored in a separate set of files to enable parallel processing. The anomaly records, which are much smaller in number than the records of the raw metrics, can be centralized at a later stage in the system to enable identifying cross-application correlations.

System 200 bins the timestamp of the records into five-minute bins 203, and averages all the record in each bin, by key. Next, system 200 smooths the averages using a rolling window average over a small size window (for example, a window size of 3) to eliminate noise for each bin 204, in case each bin has only a single value. Such instances tend to be noisy and could potentially result in an excess of anomalies if not smoothed. Using a window that is too large may lose characteristics of any underlying signal.

System 200 uses the smoothed data to maintain a set of cumulative files 205 of metric data points. Filenames include the timestamp of the time of their creation, for efficient retrieval of data based on time intervals, because the metadata of the files contains information to locate the data. Each record in these cumulative files 205 includes the key, a metric name, and a list of the n most recent metric values to enable computation of models based on historical data. When system 200 receives data for time t, system 200 uses one of the cumulative files 205 from time t-1 and merges in the data from time t, dropping any old data to maintain only the most recent n values. By maintaining cumulative files 205 as a last-in, first-out (LIFO) queue, system 200 can speed up the generation of models and alerts because only the most recent data files need to be modified. The overall architecture of system 200 is designed to work as a streaming system—data arrives in real-time, mostly sorted by timestamps, as it is generated and collected by the underlying system. System 200 is efficient if the data is arriving in this manner. System 200 is less efficient if all the data arrives at once, which is not the case in any real-time system. System 200 expects to catch the most recent data. Hence, building cumulative files 205 is effective—system 200 can keep track of a few small files for its computations.

Figure 2B:
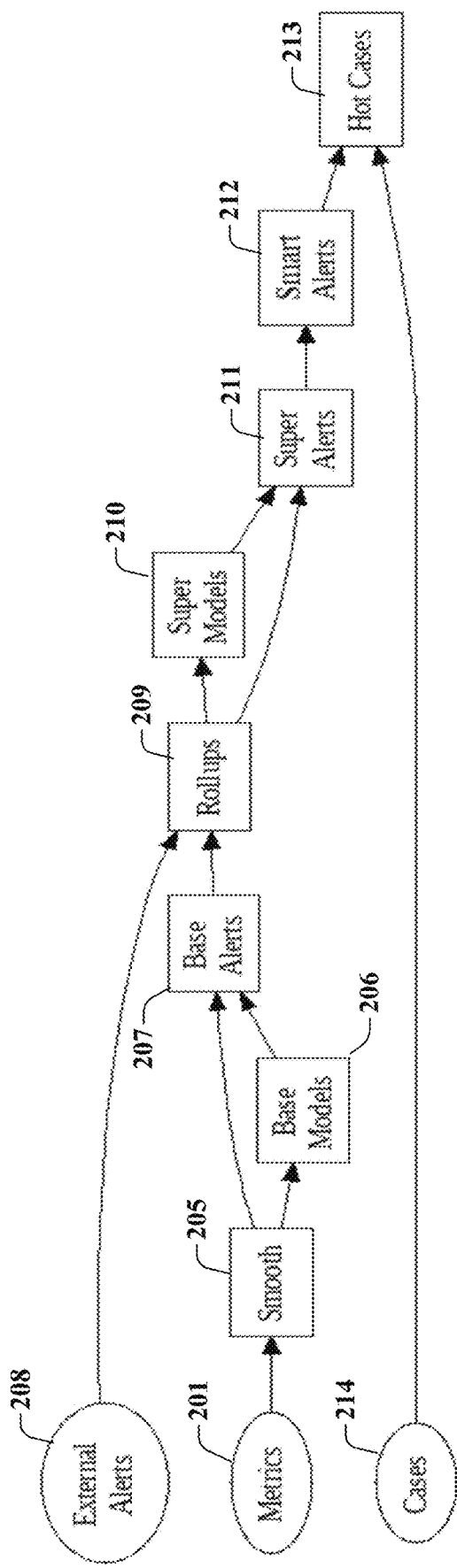
FIG. 2B is a block diagram illustrating an example, non-limiting embodiment of a modular architecture for a scalable system for generating smart alerts across a multitude of data streams functioning within the communication network of FIG. 1 in accordance with various aspects described herein.

FIG. 2B is a block diagram illustrating an example, non-limiting embodiment of a modular architecture for a scalable system for generating smart alerts across a multitude of data streams functioning within the communication network of FIG. 1 in accordance with various aspects described herein. An important aspect of the suggested architecture is modularity. For comparison, consider a black box (ordinary anomaly detection system) that receive the incoming streams of measured values and creates alerts. Such a black box system does not always adapt well to changes and also lacks transparency regarding how to adapt such a system to changes.

There are different types of changes that require adaptation. There can be changes in the input streams and in the underlying distributions of the data streams. There are changes in the way the monitored machines and virtual machines are organized and clustered (different hierarchy). There could be changes related to users, their roles, needs and preferences. The proposed architecture illustrated in FIG. 2B provides a separation of functionalities by having a sequence of modules. A module is an independent part of the system and elements of the pipeline. As such, the modules can be logical parts of the software on a single machine, software functions that run on different (physical or virtual) machines, services on different servers, etc. Each component is independent and can be modified without affecting the other modules, e.g., to cope with changing conditions. The module that creates the base alerts can be modified to include different anomaly detection algorithms or create base alerts differently. That is, the detection of base alerts can be adapted to the type of data and the underlying distribution without affecting the other modules, e.g., without affecting the creation of super alerts. Similarly, a change in the hierarchy of the monitored machines or in the clusters and aggregation levels could be followed by changing the way the rollups and the super alerts are created, without affecting the modules that precede (base alerts) and follow (smart alerts) the super alert creation. A change in a user's needs would affect the smart alerts and could either be by changing parameters of the smart alerts or by changing the model of smart alerts altogether (without affecting the other components). System 200's modularity enables flexible adaptation to change and provides control to where the change happens. In a black box approach, where the entire anomaly detection module is one unit, such flexibility is not present.

As shown in FIG. 2B, system 200 receives raw metrics 201 and creates smoothed data stored in cumulative files 205 as described above in connection with FIG. 2A. As each cumulative file 205 is updated, a corresponding model file is also updated. For each record in the cumulative file 205 that contains the last N metric values for a specific asset/metric, system 200 determines a set of statistical models used to generate baseline alerts. System 200 creates and maintains models for every fifteen-minute interval. Each model receives smoothed data and generates base alerts. These models are light weight so that they can be computed in real-time. System 200 determines several models with several different threshold values. These models are meant to capture different data behaviors. For example, trends are captured by exponential-decay models, outliers are captured by inter-quantile range (IQR) models, Hampel models ensure robustness, and Z-score models ensure sensitivity. By updating the models 206 along-side the new data, the models 206 evolve with the data, and this reduces alerts in cases or situations like level shifts. By using multiple threshold values per model, system 200 ensures the thresholds are fuzzy. Using the cumulative files 205 reduces the number of files that need to be accessed and also reduces the in-memory space needed. In an embodiment, system 200 uses the four models described above, but since the design is modular, other models can be easily added.

In block 207, the system generates baseline alerts by comparing a new or updated fifteen-minute smoothed metric data file 205 with the models 206 from the previous fifteen-minute file (which was generated based on metrics from the previous six hours). The system applies the baseline models 206 described in the previous section, at several different thresholds for each model. This generates multiple records for each metric record (i.e., a total equal to the number of models times the number of thresholds). Each baseline alert record has a field that indicates that a specific model and threshold combination alerting on the metric value. Most prior art system provide these individual records to their operations groups to address. The technological improvement disclosed herein is that the system further processes the baseline alerts to reduce a volume of alerts that operations groups need to address, by only identifying high-priority alerts that require human intervention.

In block 208, the system may incorporate external alerts generated by other monitoring systems. In large computing environments, many different systems may be monitoring different components of the environment. These external alerts may refer to the same assets for which the system collects metrics or other assets (component of a device being monitored, like CPU usage) altogether. These external alerts are formatted in such a way that the system can use them in the rollup phase described below. System alert records have a field that indicates if the record is an alert or not, but external alert records only appear when an alert is generated. Therefore, the system generates extra external alert records with zero values in the alert indicator field for time periods where there are no external alerts so that the system can compute alert densities.

Figure 2C:
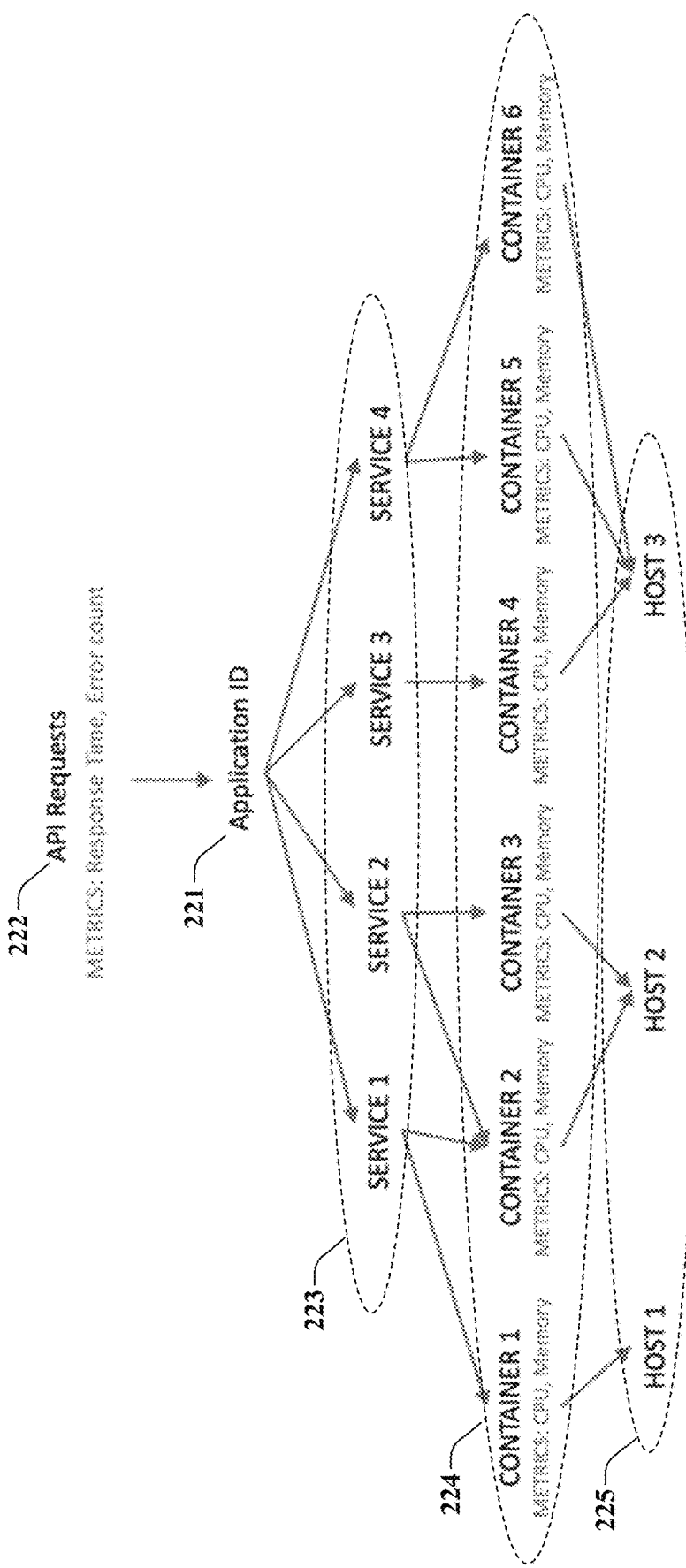
FIG. 2C is a block diagram illustrating an example, non-limiting embodiment of an operational hierarchy for a cloud-based system that generates data streams functioning within the communication network of FIG. 1 in accordance with various aspects described herein.

Turning briefly now to FIG. 2C, which is a block diagram illustrating an example, non-limiting embodiment of an operational hierarchy for a cloud-based system that generates data streams functioning within the communication network of FIG. 1 in accordance with various aspects described herein. The present technology can be applied to any hierarchical system that generates a plurality of data streams at one or more levels of the hierarchy. In the embodiment illustrated in FIG. 2C, the exemplary system 220 comprises a cloud-based application 221 at the top of the hierarchy that is installed in the cloud and accessible via Internet API requests 222. In this exemplary embodiment, cloud-based application 221 is supported by one or more services 223. Services 223 provide features needed by cloud-based application 221. The performance of services is monitored via metrics like "process CPU usage," "memory usage" and "response time."

In turn, each service 223 is supported by one or more containers 224. Containers 224 are software packages that contains everything needed to run software. Each container includes an executable program as well as system tools, libraries, and settings. By compiling all the components and keeping them in one place, containers 224 can transfer large packages of software with ease, ensuring that no key data is lost in the process. The software in containers 224 are executed on one or more hosts 225. Hosts 225 can be, for example, network elements 150-156, virtual machines or physical servers (not illustrated).

A data stream is characterized by (1) dimensions that are descriptive features and typically categorical, and (2) a temporal measurement associated with each combination of the dimensions such that each combination of dimensions gives rise to a distinct stream of measurements. Data streams are always temporal, and data can arrive at any time, but typically streams are aggregated to statistical signatures that align at desired frequencies such as t1, t2, t3 which could be milliseconds, seconds, minutes or any other time interval. For a given metric, there can be as many streams as there are combinations of dimensions. Each metric generates a data stream for any given path in the hierarchy in FIG. 2C. For example, there are three metric data streams associated with each combined key consisting of (application, service, container, host):

CPU (application, service, container, host)=cpu_t1, cpu_t2, cpu_t3, . . . .
Memory (application, service, container, host)=m_t1, m_t2, m_t3, . . . .
ResponseTime (application, service, container, host) =r_t1, r_t2, r_t3 . . . .

In a particular example, in the dimension hierarchy illustrated by the cloud-based application 221 shown in FIG. 2C, the dimensions are:

Application ID, e.g., 23901,
Names of the services they offer, e.g., "Loyalty Offers,"
ID of a container that supports the service, e.g., zlp11111-loyaltyoffers-1-4-bau-sldc-68598fc7f5-gd66q,
ID of a host that the container runs on, e.g., Host1, and
Name of the metric being measured, e.g., java.lang: HeapMemoryUsage.used.

Each combination of categorical features may have a stream of time-dependent measurements associated therewith. For example, consider that the specific combination of dimensions noted above generates a stream of (5-minute aggregate) measurements associated with it, e.g.:

2021-08-29 06:30:00|1207.4
2021-08-29 06:35:00|1234.2
2021-08-29 06:40:00|1199.1 where the average memory usage was 1207.4 units in the five-minute interval from 2021-08-29 06:30:00 to 2021-08-29 06:35:00, 1234.2 in the subsequent five-minute interval, etc. Other data streams may include temporal measurements on key performance indicators (KPIs) like Web: apiErrorCount, Web: apiResponseTime, java.lang: ProcessCpuLoad, and the like. Given thousands of applications in an enterprise with hundreds of services and dozens of containers for each service, each with tens of metric measurement data streams, any anomaly detection method, however accurate, will generate a multitude of alarms every hour, due to randomness of the metrics, resulting in a plethora of alerts that may not require any actions to correct.

In large computing environment, assets are usually described in such a hierarchical fashion. For example, the CPU metric for a host will include the host name, a cluster that the host is in, and the geographic zone. The performance metrics of a web server or database server will include the component that the server serves, and the top-level application this component is a part of. By aggregating alerts up to the higher-level components, the system can look for concentrations that are only detectable and statistically significant at those levels. Often, especially when an outage is starting to develop, there may be multiple low-level assets that are starting to alert but the level of deviation from the expected values may be exceedingly small. If, however, the alerts are aggregated up to a compute cluster, or to an application, the effect of the aggregated alerts on the decision to create a super alert will be stronger than the effect of each independent base alert. Note that in the case that a problem is starting to develop, initially there are small anomalies that are considered insignificant. But as their number grows and spans the entire cluster, the concentration of the alerts would be significant enough to create a super alert. In that sense, the effect of clustered anomalies (base alerts) on creation of super alerts is stronger than the effect of non-clustered base alerts.

For example, a physical host in a cloud environment may be having performance issues which will cause all virtual machines (VMs) and other virtual assets running thereon to slow down and create latency alerts. If all these alerts are rolled up to a record representing the physical host, the concentration of alerts will be easier to detect.

Returning to FIG. 2B, in block 209, the system identifies concentrations of alerts in time and feature space. The system permits users to define a configurable set of aggregations. Each aggregation is defined by a subset of the hierarchical key of the alert records. For example, one aggregation would use the hostname part of the key to generate one record per host, while another would use the top-level application id.

This module aggregates alerts along several predefined paths: one path represents the physical hierarchy: VMs and physical hosts. The other represents the application hierarchy: components, services, and applications. For each level of aggregation, the number of alerts and the number of models and thresholds (the denominator for calculating alert densities) are summed up. The input base alerts are also passed through as a level 0 aggregation. The system essentially generates a timeseries of alerts, at varying levels of aggregation.

In modules 210-213, the system performs operations in the alerts domain. The system puts the timeseries of alerts through a model analyzer process, similar to the technique used to generate the models 206 that analyzed the baseline alert, except that these super models apply to alert densities, and not to metric values. In block 210, the system generates the super models for this analysis. Such processing is also illustrated in a co-pending patent application entitled "System and Method for Generating Alerts Using Outlier Density," filed on even date herewith, which is incorporated by reference herein.

In module 211, the system generates super alerts by comparing the rolled-up alert data with the super model data. Instead of calculating alert densities based on the number of models and thresholds, each set of model/threshold votes are summed up. If the number of votes exceed a minimum value, the system generates a single super alert record. Otherwise, the system generates a record indicating that there is not a super alert. The super alerts represent anomalies that are pervasive, i.e., comprising a large concentration of alerts across one or more components of the monitored system.

In module 212, the system further prioritizes super alerts based on their recency (e.g., "must have occurred in the last 15 minutes") and an extent of deviation of the intensity of the hotspot (e.g., how different is the anomaly-concentration from that dictated by the model). The system can tune the configurable ranking of such so-called smart alerts based on the resources available to the operations group.

In large systems, in addition to using multiple monitoring tools, it is also common to have multiple alert analytics tools that filter alerts to reduce the number of alerts. Such systems entail grouping anomalies that are clustered together in time (repeated, related anomalies) into a single case; or by matching alerts against another source of information, e.g., a ticketing system or a customer care line where users report problems with the system. In module 213, the system monitors such cases 214 to both evaluate the results provided by such cases 214 and also to validate the results produced by the system. Such cases 214 are expected to use the same set of parameters as keys and also use the same time zone. To find matches, the system looks for records in the external system that are close in time and share enough of the key parameters. Since the system generates alerts at higher levels of aggregation than the tools, some of the records will have some parameters marked as ALL, indicating that they apply to all alert records for that parameter. The system uses a matching rule that keys match if at least one parameter of the key matches exactly (i.e., they have a non-ALL value and they match), and there are no match failures (i.e., they have non-ALL values and they are different). The rest of the parameters may have the value ALL in the records. The system scores the external records on the level and number of smart alerts that they match.

As illustrated in FIG. 2B, the proposed architecture provides modularity (various parts can be replaced or scaled up without affecting other parts of the system), support for streaming data (accumulating the data and using it effectively for anomaly detection and model retraining), adaptation to the cloud and aggregation of anomalies. The system uses various anomaly detection models to create baseline alerts, changes the model retraining frequency, and has the ability to apply each module independently, including the smoothing, baseline alert computation, super alert computation, and smart alert computation. When needed, the system could provide a stream of baseline alerts, super alerts or smart alerts to downstream applications.

Previous alerting systems focused on individual alerts and reducing the number of false positives. Some systems reduced the number of alerts by suppressing alerts that were close together in time. While this approach might be effective while monitoring a limited number of streams, the approach fails when monitoring a massive number of streams which would generate a large number of alerts by sheer statistical chance, at random points in time, in random series.

The disclosed system focuses on significant hotspots of anomalies—an "unusual" density of alerts that are concentrated in time and/or affect a multiple set of streams. Unusual is defined with reference to recent history so that density of anomalies has to be significant compared to the constantly evolving historical norm, not based on some fixed threshold. The system identifies unusually long or short runs of anomalies, as well as unusual co-occurrence of anomalies across multiple streams.

Furthermore, by imposing additional constraints (learned from historical data) on recency and extremeness of the density, the system ensures that the smart alerts are relevant and actionable. This is a unique aspect to the disclosed alerting system and provides the operators with smart alerts that are significant since they affect multiple objects (streams) and are not one-off and not remediated by the AI-based self-correcting solutions baked into the system. Furthermore, descriptions of the objects aid the system to locate the smart alert in the domain space (e.g., cloud components) and the hierarchy of the smart alerts in the hotspot could potentially point to the propagation of the anomalies.

Monitoring data streams is essential in many domains, to guarantee that downstream applications receive usable data. It is vital to monitor the flow of data streams between on-premises applications and the cloud, detect anomalies in streaming data in content delivery networks, manage streaming data that feed data lakes, and guarantee the quality and suitability of data streams that feed machine learning applications. Smart alerts distill thousands of anomalies into a manageable number of actionable alerts based on priority, persistence, pervasiveness, perseverance, and recency. Doing so prevents operations groups from being overwhelmed by the sheer number of anomalies resulting in critical alerts being missed or ignored. With the growing importance of the cloud, data lakes, content delivery networks and machine learning (ML) applications that rely on increasing volumes and varieties of streaming data, the significance of effective monitoring of streams will only increase.

While for purposes of simplicity of explanation, the respective processes are shown and described as a series of blocks in FIGS. 2A and 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods presented in FIGS. 1, 2A, 2B, 2C and 3. For example, virtualized communication network 300 can facilitate in whole or in part monitoring a computational hierarchy; forming modules for generating base alerts with a hierarchical key associated with an operation of the computational hierarchy and for rolling up the base alerts based on the computational hierarchy, for generating super alerts from a concentration of the rolled up base alerts; and for including a first plurality of models that selects the super alerts based on priority, persistence of anomalies, pervasiveness of the super alerts generated, recency, or a combination thereof, and generates a smart alert based on voting on the super alerts selected by the first plurality of models, and for presenting the smart alert on a user interface.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
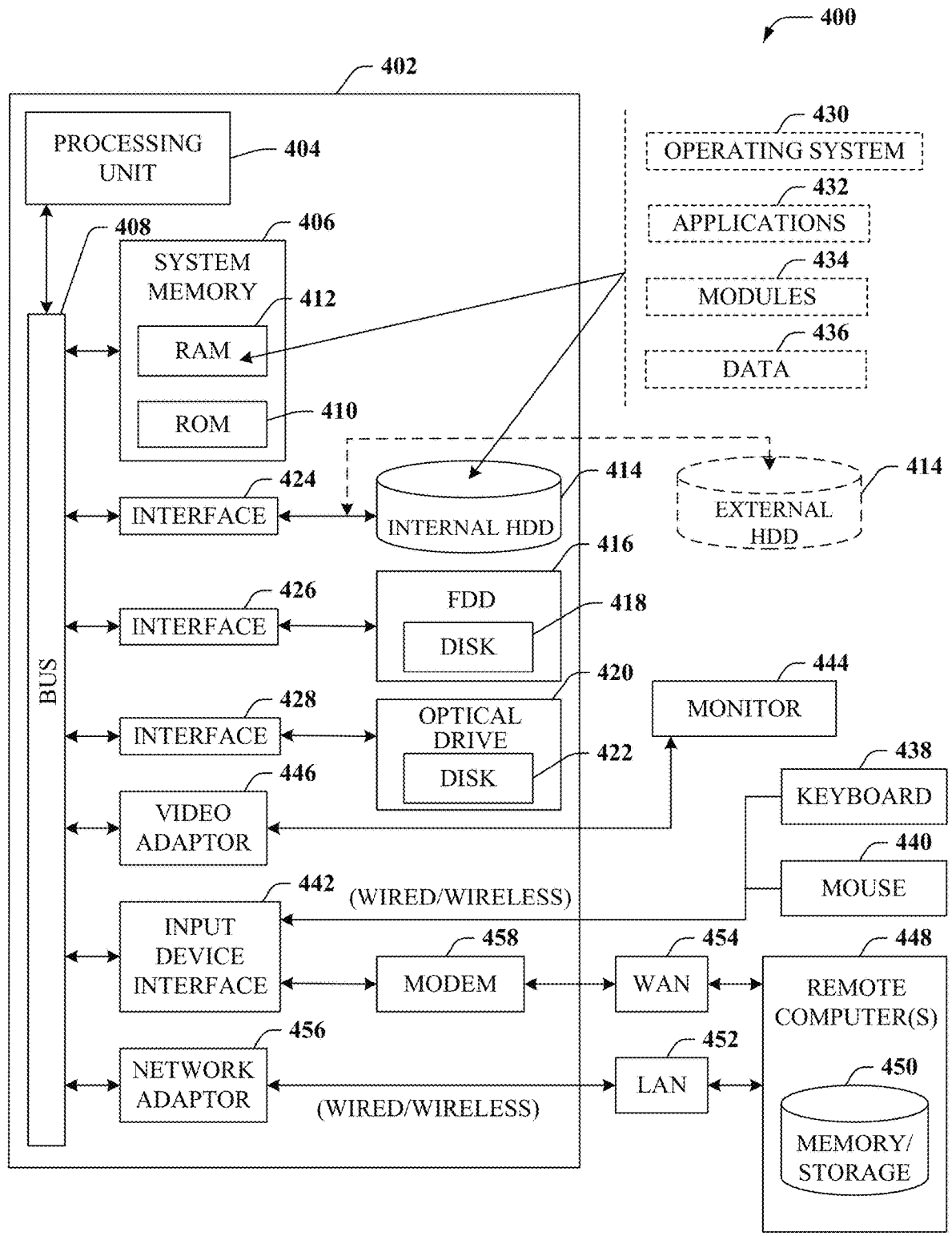
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part monitoring a computational hierarchy; forming modules for generating base alerts with a hierarchical key associated with an operation of the computational hierarchy and for rolling up the base alerts based on the computational hierarchy, for generating super alerts from a concentration of the rolled up base alerts; and for including a first plurality of models that selects the super alerts based on priority, persistence of anomalies, pervasiveness of the super alerts generated, recency, or a combination thereof, and generates a smart alert based on voting on the super alerts selected by the first plurality of models, and for presenting the smart alert on a user interface.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
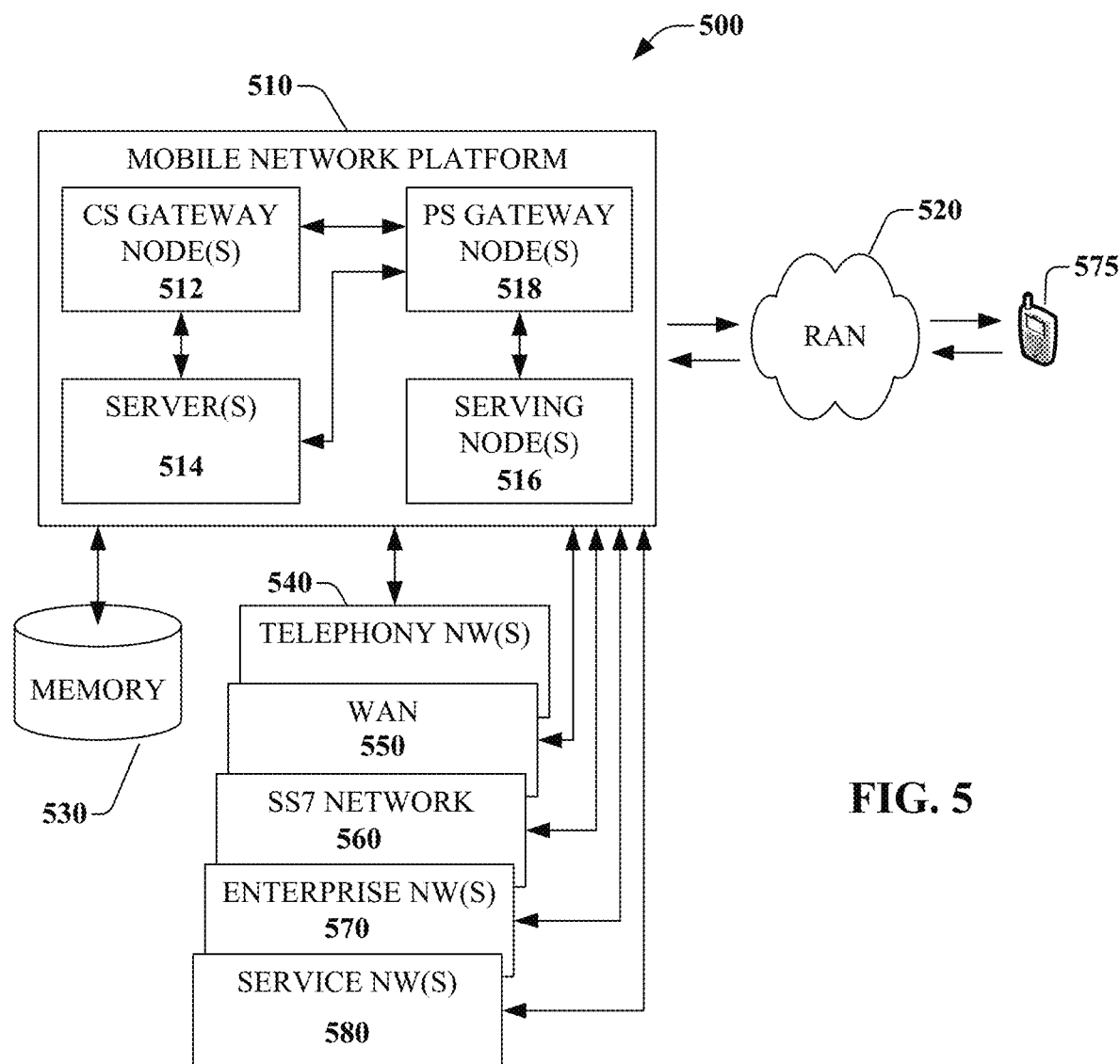
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part monitoring a computational hierarchy; forming modules for generating base alerts with a hierarchical key associated with an operation of the computational hierarchy and for rolling up the base alerts based on the computational hierarchy, for generating super alerts from a concentration of the rolled up base alerts; and for including a first plurality of models that selects the super alerts based on priority, persistence of anomalies, pervasiveness of the super alerts generated, recency, or a combination thereof, and generates a smart alert based on voting on the super alerts selected by the first plurality of models, and for presenting the smart alert on a user interface. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
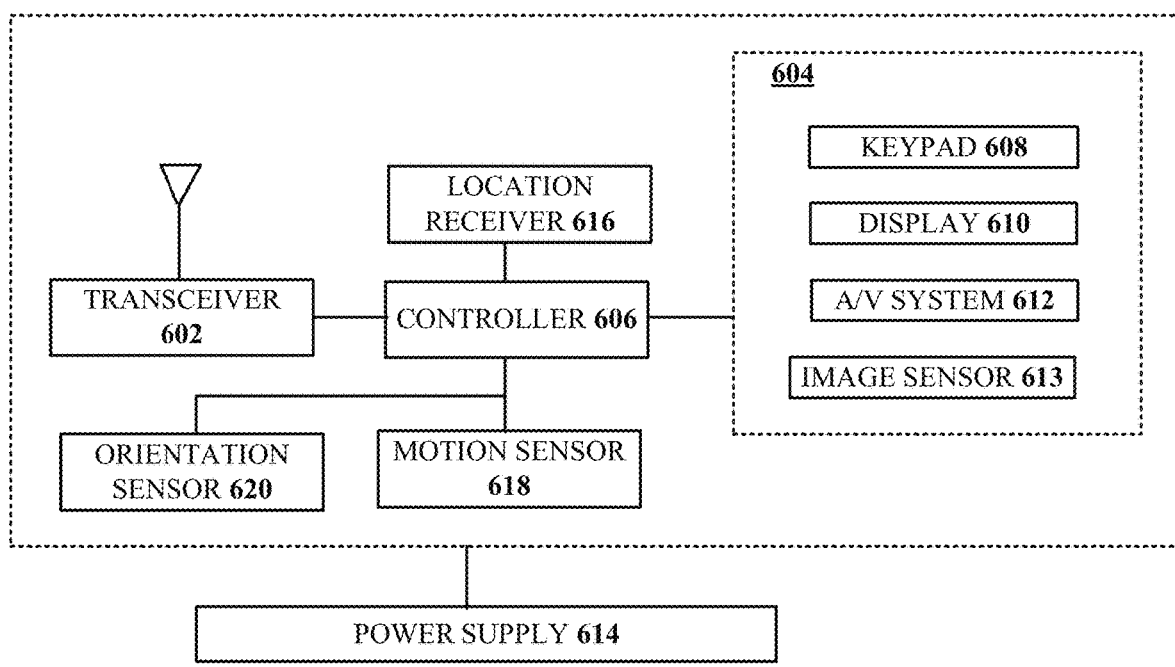
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part monitoring a computational hierarchy; forming modules for generating base alerts with a hierarchical key associated with an operation of the computational hierarchy and for rolling up the base alerts based on the computational hierarchy, for generating super alerts from a concentration of the rolled up base alerts; and for including a first plurality of models that selects the super alerts based on priority, persistence of anomalies, pervasiveness of the super alerts generated, recency, or a combination thereof, and generates a smart alert based on voting on the super alerts selected by the first plurality of models, and for presenting the smart alert on a user interface.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smart phone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and a memory that stores executable instructions that, when executed by the processing system, define operations of modules that monitor a computational hierarchy, the modules comprising:
a first module for generating base alerts with a hierarchical key associated with an operation of the computational hierarchy and for rolling up the base alerts based on the computational hierarchy, resulting in rolled-up base alerts;
a second module for generating super alerts from a concentration of the rolled-up base alerts; and
a third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

2. The device of claim 1, wherein the first module comprises a second plurality of models including an exponential-decay model, an inter-quantile range model, a Hampel model, a Z-score model, or a combination thereof.

3. The device of claim 2, wherein each model in the second plurality of models is light weight and can be computed in real-time.

4. The device of claim 3, wherein each model in the second plurality of models comprises multiple threshold values for generating the base alerts.

5. The device of claim 1, wherein the rolled-up base alerts are determined by a configurable set of aggregations defined by a subset of the hierarchical key of the computational hierarchy.

6. The device of claim 5, wherein the subset comprises a hostname from the computational hierarchy.

7. The device of claim 1, wherein the second module determines whether the concentration of the rolled-up base alerts spans across one or more components of the computational hierarchy.

8. The device of claim 1, wherein the processing system comprises a plurality of processors operating in a distributed computing environment.

9. A non-transitory, machine-readable medium, comprising executable instructions that, when executed by a processing system including a processor, facilitate formation and operations of a plurality of modules that monitor a computational hierarchy, the modules comprising:
a first module for generating base alerts with a hierarchical key associated with an operation of the computational hierarchy and for rolling up the base alerts based on the computational hierarchy, resulting in rolled-up base alerts;
a second module for generating super alerts from a concentration of the rolled-up base alerts; and
a third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

10. The non-transitory, machine-readable medium of claim 9, wherein the first module comprises a second plurality of models including an exponential-decay model, an inter-quantile range model, a Hampel model, a Z-score model, or a combination thereof.

11. The non-transitory, machine-readable medium of claim 10, wherein each model in the second plurality of models is light weight and can be computed in real-time.

12. The non-transitory, machine-readable medium of claim 11, wherein each model in the second plurality of models comprises multiple threshold values for generating the base alerts.

13. The non-transitory, machine-readable medium of claim 9, wherein the rolled-up base alerts are determined by a configurable set of aggregations defined by a subset of the hierarchical key of the computational hierarchy.

14. The non-transitory, machine-readable medium of claim 13, wherein the subset comprises a hostname from the computational hierarchy.

15. The non-transitory, machine-readable medium of claim 9, wherein the second module determines whether the concentration of the rolled-up base alerts spans across one or more components of the computational hierarchy.

16. The non-transitory, machine-readable medium of claim 9, wherein the processing system comprises a plurality of processors operating in a distributed computing environment.

17. A method, comprising:
facilitating formation and operations of a first module, by a processing system including a processor, the operations comprising generating base alerts with a hierarchical key associated with an operation of a computational hierarchy and for rolling up the base alerts based on the computational hierarchy, resulting in rolled-up base alerts;
facilitating formation and operations of a second module, by the processing system, the operations of the second module comprising generating super alerts from a concentration of the rolled-up base alerts; and
facilitating formation and operations of a third module, by the processing system, the third module comprising a first plurality of models that selects the super alerts based on priority, persistence of anomalies, pervasiveness of the super alerts generated, recency, or a combination thereof, generates a smart alert based on voting on the super alerts selected by the first plurality of models, and presents the smart alert on a user interface.

18. The method of claim 17, wherein the first module comprises a second plurality of models including an exponential-decay model, an inter-quantile range model, a Hampel model, a Z-score model, or a combination thereof, wherein each model in the second plurality of models is light weight and can be computed in real-time, and wherein each model in the second plurality of models comprises multiple threshold values for generating the base alerts.

19. The method of claim 17, wherein the rolled-up base alerts are determined by a configurable set of aggregations defined by a subset of the hierarchical key of the computational hierarchy.

20. The method of claim 17, wherein the second module determines whether the concentration of the rolled-up base alerts spans across one or more components of the computational hierarchy.

* * * * *